United States Patent [19]

Turner

[11] 4,138,616

[45] Feb. 6, 1979

[54] VARIABLE SLOPE TEMPERATURE TRANSDUCER

[75] Inventor: Robert B. Turner, Weymouth, Mass.

[73] Assignee: Johnson & Johnson, New Brunswick, N.J.

[21] Appl. No.: 758,628

[22] Filed: Jan. 12, 1977

[51] Int. Cl.$^2$ .................... H03K 1/14; G01K 7/00
[52] U.S. Cl. .................... 307/310; 307/297; 307/229; 73/362 SC
[58] Field of Search .................... 307/296, 297, 310; 73/362 C; 330/19

[56] References Cited

U.S. PATENT DOCUMENTS

| | | | |
|---|---|---|---|
| 3,659,121 | 4/1972 | Frederiksen | 330/22 |
| 3,831,040 | 8/1974 | Nanba | 307/297 |
| 3,992,676 | 11/1976 | Knight | 330/19 |
| 4,047,435 | 9/1977 | Keith | 73/362 C |

Primary Examiner—Stanley D. Miller, Jr.
Assistant Examiner—B. P. Davis

[57] ABSTRACT

A temperature sensitive transducer circuit for use as a temperature sensor in an electronic thermometer is provided having a variable response curve or slope. A semiconductor device may be used as the primary temperature sensing component. Preferably, the semiconductor device includes two diode-effect components connected in series to circuit ground. A voltage supply may be connected to the semiconductor device through a current limiting component. A variable current limiting component may be connected across one of the diode-effect components. An amplifier component may be connected to the semiconductor device to adjust the output gain of the circuit.

1 Claim, 1 Drawing Figure

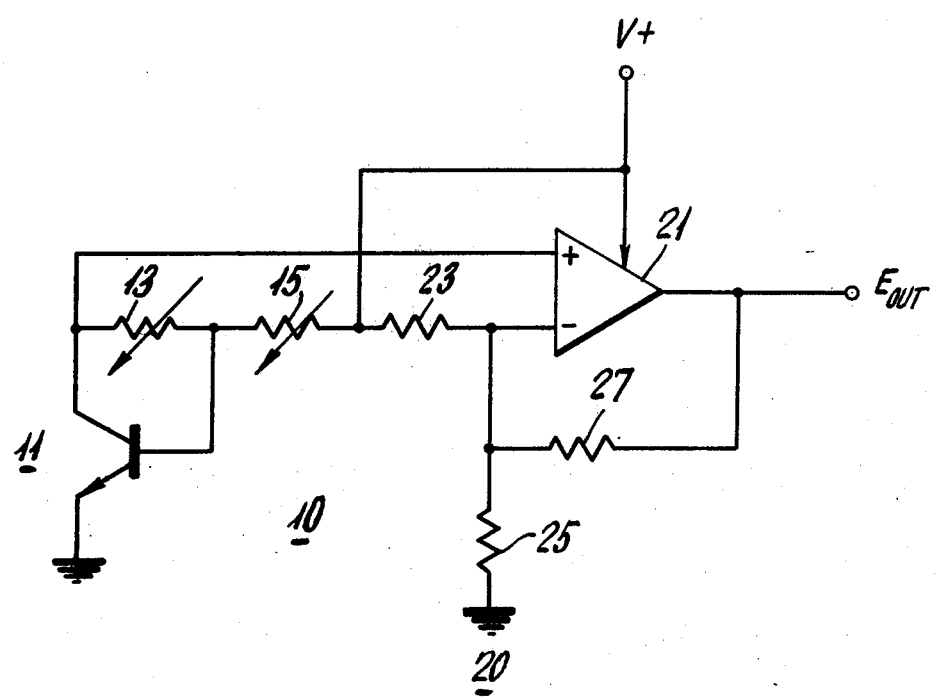

VARIABLE SLOPE TEMPERATURE TRANSDUCER

BACKGROUND OF THE INVENTION

Semiconductor devices have been utilized as temperature transducers for circuit applications in the past. Quite often transistor is connected in common emitter configuration between a supply voltage and ground to provide a reference voltage input to an operational amplifier. Since the operating characteristics of the transistor change or drift with ambient temperature, the transistor can be used as a temperature transducer.

The temperature coefficient, the number in millivolts per degrees centigrade, describes the response of the transistor with temperature. Because of the state of present day semiconductor technology, this response curve is rather linear over a broad range of temperatures. The temperature coefficient number, therefore, defines the slope of the output curve of a transistor with changes in ambient temperature.

Individual temperature coefficients tend to vary with individual transistors. Because of this fact, when a temperature sensing circuit using a transistor temperature transducer was to be produced in any quantity a manufacturer has had to select specially-grown, specially-selected matched transistors having the same temperature coefficient. This is an expensive procedure and it substantially raises the manufacturing costs of the circuit.

It is desirable, therefore, to provide a transistor, temperature transducer circuit which can use less expensive transistors having temperature coefficient values which may vary from individual transistor to transistor. Such a circuit should be able to be calibrated to a desired temperature coefficient preferably with a single adjustment.

An objective of this invention is to provide a temperature transducer circuit, using a transistor as the temperature sensing component, having a variable slope response curve.

A second objective of this invention is to provide a transistor, temperature transducer circuit having a single adjustment for calibrating the circuit to a specific slope or response curve.

A further objective of this invention is to include a single adjustable component adjacent to the temperature sensing transistor.

An even further objective of this invention is to provide a single adjustable component for adjusting the voltage reference point of the circuit.

SUMMARY OF THE INVENTION

The objectives of this invention are realized by an ambient temperature sensitive circuit having a variable slope temperature responsive output curve. A transistor may be connected in common emitter configuration to drive an amplifier off of its collector terminal. The collector output to the amplifier will change with temperature in direct relationship to the temperature coefficient of the transistor circuit.

The amplifier's gain may be determined beforehand for compatibility with the environment in which it is to operate.

A supply voltage may be connected to the base terminal of the transistor via a current limiting resistor whose resistance may be varied to establish the voltage reference point for the circuit. Preferably a variable shunt resistance may be connected between the collector and the base of the transistor.

The temperature coefficient of the transistor circuit and therefore the slope of the temperature response curve may be varied by changing the value of the variable shunt resistance connected between the transistor collector and base terminals.

With a negative supply voltage available a PNP transistor is used in the circuit. With a positive supply voltage available, an NPN transistor is used in the circuit.

DETAILED DESCRIPTION OF THE INVENTION

The various features and advantages of this variable slope temperature transducer apparatus will be realized from the following description read in view of the accompanying drawing. This drawing is a schematic diagram of the temperature transducer circuitry 10 which may be connected directly to input the arithmetic unit of an electronic thermometer.

An NPN transistor 11 is connected with its emitter tied to circuit ground. This transistor 11 can be any of those readily available in the marketplace, such as a type 2N4274 as supplied by National Semiconductor.

Connected across the collector and base terminals of the transistor 11 is a variable resistance 13. This resistance 13 limits the current which can pass across the collector-base junction of the transistor 11.

The base terminal of the transistor 11 is connected to a positive voltage supply V+ through a second variable resistance 15, being in serial connection.

The collector terminal of the transistor 11 being the output of the circuit is tied to the positive input terminal of an operational amplifier 21. The negative input terminal of amplifier 21 is connected to the intermediate point of a resistance voltage divider. This voltage divider includes two resistances 23, 25 (R23, R25) connected in series between the supply voltage V+ and circuit ground, respectively. The amplifier 21 negative input terminal is connected to the interconnection point of resistances 23, 25. The amplifier 21, which can be any readily available type amplifier, such as a CA 324, as supplied by RCA Corporation or Motorola Corporation, is powdered directly by the supply voltage V+.

A feedback resistance 27 (R27) is connected between the amplifier 21 output and its negative input terminals. These resistances 23, 25, 27 determine the gain of the amplifier 21 according to the following ratio: gain = R 27/R 23 + R 25. Typically for use as an input to an electronic thermometer, the amplifier 21 gain is set at 20.

The output of the amplifier 21 becomes the output of the temperature transducer circuit 10 and can be fed directly into the arithmetic unit of an electronic thermometer.

As transistor 11 operating characteristics vary with ambient temperature, the output of this transistor 11 varies according to the temperature coefficient of the transistor 11. By adjusting the temperature coefficient of the transistor 11 the slope of the output curve for the entire transducer circuit can be adjusted.

The present invention, therefore, provides a transducer circuit having a single adjustment, the adjustable resistance 13 for setting and adjusting the temperature coefficient of the circuit. A single adjustment, the adjustable resistance 15, is likewise provided for establishing the voltage reference point of the circuit.

With variable resistor 13 shunted across transistor 11 collector to base, it regulates or limits the amount of current flowing across the collector-base junction of this transistor 11. The resistor 13, 15 form a sort of voltage divider. The resistance ratio of resistor 13 to resistor 15 bears upon the current flowing in the circuit across the collector-base junction and across the base-emitter junction of the transistor 11 which in turn bears on the effective overall temperature coefficient for the transistor 11.

When the value of the collector to base resistor 13 exceeds the supply resistor 15, the effective overall temperature coefficient for the circuit will have a plus value. Output voltage at the transistor 11 collector will increase with an increase in ambient temperature. As the value of the collector to base resistor 13 is adjusted to a lesser value than the supply voltage resistor 15, the positive temperature coefficient begins to decrease, linearly, through a zero point and becomes a negative temperature coefficient where the voltage out for the whole circuit decreases with an increase in ambient temperature.

The present design presents a structure which may be implemented by mass production and where differences in individual temperature coefficients may be compensated for by a single adjustment of a single resistance component. This permits the use of less expensive components and a reduction in the overall production cost for the circuit.

The present description is to be considered as illustrative and not in the limiting sense. Many changes could be made in the principal embodiment given above without departing from the scope thereof.

What is claimed is:

1. A variable slope temperature sensitive transducer circuit for use with electronic thermometers and the like which provide a supply voltage and ground to said circuit, comprising:

a temperature sensitive semiconductor component having a plurality of terminals, said component being connected to said supply voltage and said ground and presenting a reference voltage output which varies with ambient temperature according to the temperature coefficient of said semiconductor component; and means for adjusting said semiconductor component temperature coefficient, said means being connected across two terminals of said semiconductor component and to said voltage supply; wherein said semiconductor component is a transistor connected in common emitter configuration with its collector terminal being the output thereof; and also including an amplifier component having an input connected to said transistor output, said amplifier component also being connected to said voltage supply and said circuit ground and having plus and negative input terminals; wherein said temperature coefficient adjusting means includes:

a first resistance connected between said transistor collector and base terminals, said first resistance being adjustable to have a direct effect upon said transistor temperature coefficient; and a second resistance connected between said voltage supply and said transistor base terminal, wherein said voltage supply is a positive voltage supply; wherein said transistor is an NPN transistor; wherein said transistor output is connected to the plus input of said amplifier component; wherein said amplifier component is connected to said ground through a third resistance connected to the negative input of said amplifier component; and wherein said amplifier component is connected to said voltage supply through a forth resistance connected to the negative input of said amplifier component; and also including a fifth feedback resistance connected between the negative input and the output of said amplifier component.

* * * * *